US009141361B2

(12) United States Patent
Haber et al.

(10) Patent No.: US 9,141,361 B2
(45) Date of Patent: Sep. 22, 2015

(54) METHOD AND APPARATUS FOR PERFORMANCE EFFICIENT ISA VIRTUALIZATION USING DYNAMIC PARTIAL BINARY TRANSLATION

(71) Applicants: Gadi Haber, Nesher (IL); Konstantin Kostya Levit-Gurevich, Kiryat Byalik (IL); Esfir Natanzon, Haifa (IL); Boris Ginzburg, Haifa (IL); Aya Elhanan, Gan Yoshiya (IL); Moshe Maury Bach, Haifa (IL); Igor Breger, Haifa (IL)

(72) Inventors: Gadi Haber, Nesher (IL); Konstantin Kostya Levit-Gurevich, Kiryat Byalik (IL); Esfir Natanzon, Haifa (IL); Boris Ginzburg, Haifa (IL); Aya Elhanan, Gan Yoshiya (IL); Moshe Maury Bach, Haifa (IL); Igor Breger, Haifa (IL)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 13/632,089

(22) Filed: Sep. 30, 2012

(65) Prior Publication Data

US 2014/0095832 A1 Apr. 3, 2014

(51) Int. Cl.
*G06F 9/30* (2006.01)
*G06F 9/45* (2006.01)
*G06F 9/455* (2006.01)
*G06F 11/36* (2006.01)

(52) U.S. Cl.
CPC .............. *G06F 8/52* (2013.01); *G06F 9/45558* (2013.01)

(58) Field of Classification Search
None
See application file for complete search history.

(56) References Cited

U.S. PATENT DOCUMENTS

2009/0031108 A1* 1/2009 Henry et al. .................... 712/32

* cited by examiner

*Primary Examiner* — Scott Sun
(74) *Attorney, Agent, or Firm* — Mnemoglyphics, LLC; Lawrence M. Mennemeier

(57) ABSTRACT

Methods, apparatus and systems for virtualization of a native instruction set are disclosed. Embodiments include a processor core executing the native instructions and a second core, or alternatively only the second processor core consuming less power while executing a second instruction set that excludes portions of the native instruction set. The second core's decoder detects invalid opcodes of the second instruction set. A microcode layer disassembler determines if opcodes should be translated. A translation runtime environment identifies an executable region containing an invalid opcode, other invalid opcodes and interjacent valid opcodes of the second instruction set. An analysis unit determines an initial machine state prior to execution of the invalid opcode. A partial translation of the executable region that includes encapsulations of the translations of invalid opcodes and state recoveries of the machine states is generated and saved to a translation cache memory.

36 Claims, 7 Drawing Sheets

METHOD AND APPARATUS FOR
PERFORMANCE EFFICIENT ISA
VIRTUALIZATION USING DYNAMIC
PARTIAL BINARY TRANSLATION

FIELD OF THE DISCLOSURE

This disclosure relates generally to the field of computers and/or microprocessors. In particular, the disclosure relates to Instruction Set Architecture (ISA) virtualization using dynamic partial binary translation.

BACKGROUND OF THE DISCLOSURE

Binary translation in computers refers to the emulation of one instruction set by another through translation of assembly level code or instructions. Sequences of instructions are translated from the source instruction set to the target instruction set. Static binary translation aims to convert all of the code of an executable file into code that runs on the target architecture without having to run the code first, as is done in dynamic binary translation. This is very difficult to do correctly, since not all the code can be discovered by the translator. For example, some parts of the executable may be reachable only through indirect branches, whose value is known only at run-time.

Dynamic binary translation looks at a short sequence of code—typically on the order of a single basic block—then translates it and caches the resulting sequence. Code is only translated as it is discovered and when possible branch instructions are made to point to already translated and saved code. In some cases such as instruction set simulation, the target instruction set may be substantially the same as the source instruction set, providing testing and debugging features such as instruction trace, conditional breakpoints and hot spot detection. Dynamic binary translation differs from simple emulation (eliminating the emulator's main read-decode-execute loop, which is a major performance bottleneck), paying instead a one-time large overhead during translation. Any such translation overhead is hopefully amortized as translated code sequences are executed multiple times.

In partial binary translation, the native ISA code is executed when possible and only parts of it are translated and run from the translation cache area. This approach is suitable for translating code from a central processing unit (CPU) of one architecture to a CPU of a similar architecture type where some subset of instructions may not be supported on the target architecture. ISA consistency between similar but different CPU types is important in systems that include heterogeneous high-performance and power-efficient CPUs in order to produce superior performance per power capabilities.

However, ISA consistency among different CPU types is considered a hard problem to solve due to the heavy constraints on manufacturing costs of the hardware and very tight limits on the power consumption and chip areas for CPUs that need to operate in small devices which do not typically include elaborate cooling components. As a result, there is an ISA gap between the lower-end embedded CPUs designed for small low-power devices versus the high-end CPUs designed for desktop computers or servers and include additional ISA features for enhanced computation.

To date, potential solutions to such under utilization, fault tolerance, performance and efficiency limiting issues have not been adequately explored.

BRIEF DESCRIPTION OF THE DRAWINGS

The present invention is illustrated by way of example and not limitation in the figures of the accompanying drawings.

DETAILED DESCRIPTION

Figure 1:
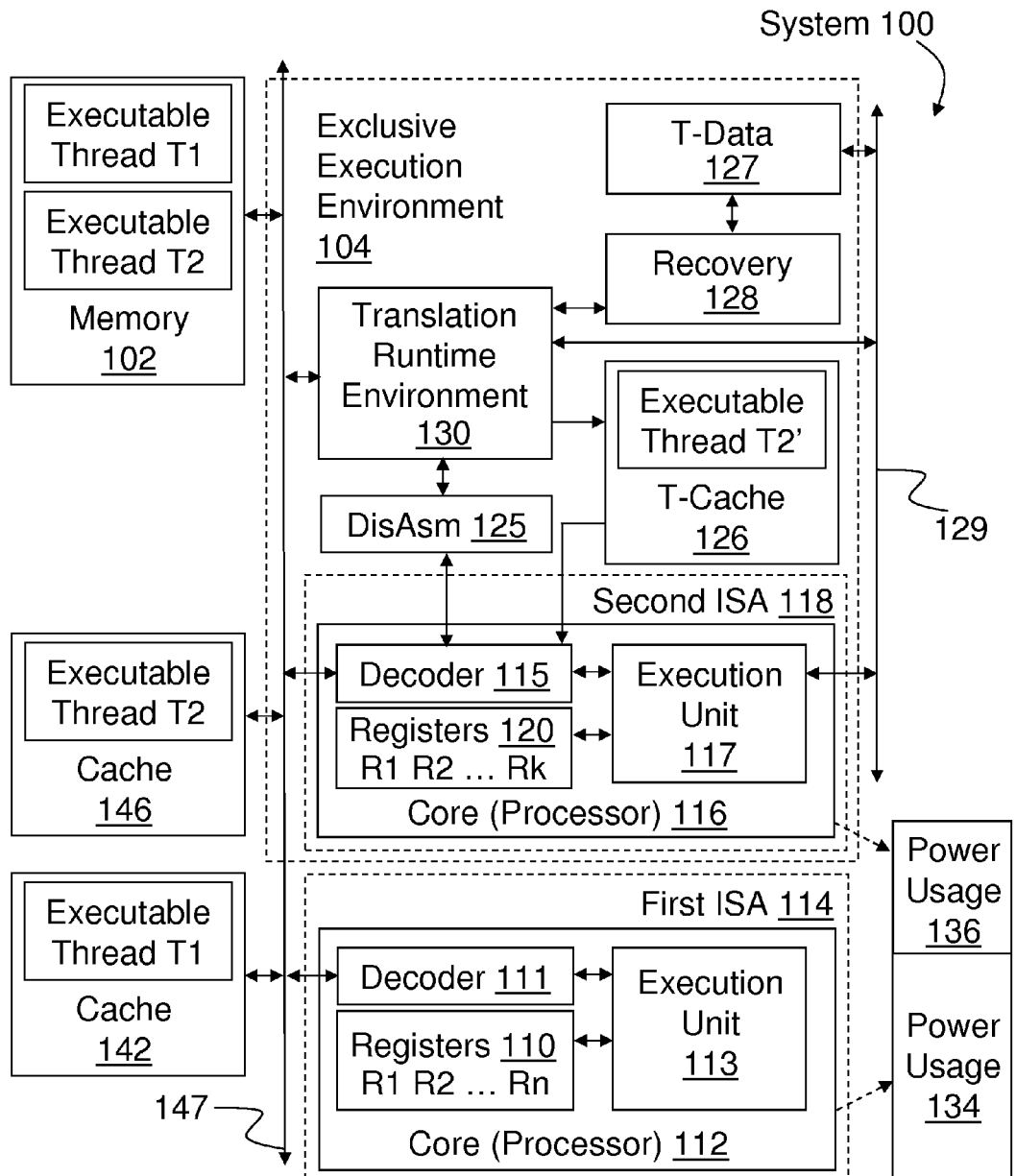
FIG. 1 illustrates one embodiment of an asymmetric multiprocessor system for providing Instruction Set Architecture (ISA) virtualization using dynamic partial binary translation functionality.

Methods, apparatus and computing systems are disclosed herein comprising addressable memory to store executable threads or program portions encoded in a particular native instruction set. Some embodiments include a multiprocessor or multiple core processor with one heterogeneous processor core to execute the native instruction set in which the executable threads or program portions are encoded, and a second heterogeneous processor core having a second instruction set excluding at least some portion of the native instruction set. Other embodiments may include only the second processor core type, which may be less complex, and/or more cost effective, and/or consume less power than a processor core to execute the entire native instruction set in which the executable threads or program portions are encoded.

Embodiments of the second heterogeneous processor core may also include an instruction decoder to receive executable thread portions or program portions in their native instruction set, and detect opcodes which are invalid opcodes of the second instruction set. In some embodiments, a microcode layer disassembler of the second heterogeneous processor core may determine if the invalid opcode belongs to the native instruction set in which the executable threads or program portions are encoded, and hence should be translated. A translation runtime environment of some embodiments of the second heterogeneous processor core may then identify an executable region containing the invalid opcode and at least any other proximate invalid opcodes and interjacent valid opcodes of the second instruction set for executing, and optionally repeatably re-executing upon future detection of the invalid opcode. Embodiments of a translation runtime environment of the second processor core may also include an analysis unit to analyze the executable region to determine at least an initial machine state prior to the execution of the invalid opcode. The translation runtime environment generates a partial binary translation of the entire executable region, the partial binary translation including at least an encapsulation of a binary translation of the invalid opcode and a state recovery mechanism of the initial machine state. An indicator is stored of the partial binary translation associated with the invalid opcode, and the partial binary translation is saved to an exclusive translation cache memory for re-executing upon future detection of the invalid opcode.

In the disclosure that follows, terms such as threads, programs, and processes may be used interchangeably to describe embodiments of instruction sequences or command sequences of programming languages or machine languages or both, or alternatively as the executing sequences themselves or as the processing devices executing the sequences. Through partial binary translation, executable threads or program portions encoded in a particular native instruction set may be executed by a second heterogeneous processor core having a second instruction set that excludes at least some portion of the native instruction set, and which may be less complex, and/or more cost effective, and/or consume less power than a processor core to execute the entire native instruction set. Thus the native ISA is virtualized by a processor without requiring operating system knowledge of, or assistance in the partial binary translation.

It will be appreciated that for embodiments to support instructions of a first processing core using a second processing core, where the first and second cores may use differing amounts of power during execution of the same portions of executable threads of instructions, provides opportunities to save costs and/or power consumption for some applications, while supporting features of a richer native instruction set of the first processing core. The second core may consume a smaller maximum power during normal operation at maximum frequency and voltage due to having fewer logic elements, different semiconductor construction, less complex micro-architectural components, and so forth. Thus benefits such as cost savings and/or reduced power consumption may be realized by various embodiments of the herein disclosed methods, apparatus and systems for virtualization of a native instruction set.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

FIG. 1 illustrates one embodiment of an asymmetric multiprocessor system 100 for providing ISA virtualization using dynamic partial binary translation functionality. As described herein, this architecture provides for migration of program code between cores using dynamic partial binary translation functionality.

A memory 102 comprises computer-readable storage media (CRSM) and may be any available physical media accessible by a processing core or other device to implement the instructions stored thereon or store data within. The memory 102 may comprise a plurality of logic elements having electrical components including transistors, capacitors, resistors, inductors, memristors, and so forth. The memory 102 may include, but is not limited to, random access memory (RAM), read-only memory (ROM), electrically erasable programmable read-only memory (EEPROM), flash memory, magnetic storage devices, and so forth.

Within the memory 102 may be stored an operating system (not shown). The operating system is configured to manage hardware and services within the system 100 for the benefit of the operating system (OS) and one or more applications. During execution of the OS and/or one or more applications, one or more threads, e.g. executable threads T1 and T2, are stored for execution by a core or other processor. Each of the executable threads T1 and T2 in this example may be encoded in a particular native instruction set, e.g. the instruction set of the first ISA 114. In some embodiments the instruction set of the first ISA 114 may comprise x86 instructions including, for example, Advanced Vector Extension (AVX) instructions for execution by Intel® microprocessors and/or AMD microprocessors.

Embodiments of asymmetric multiprocessor system 100 also comprise a first heterogeneous processor core 112 having a first instruction set, e.g. the instruction set of the first ISA 114, and a second heterogeneous processor core 116 having a second instruction set, e.g. the instruction set of the second ISA 118, and excluding a portion of the first instruction set, for example, excluding support for some or all of the AVX instructions of the first ISA 114.

In some implementations the first core 112 and the second core 116 may be coupled to one another using a bus or interconnect 147. The interconnect 147, as is the case with other interconnects herein described, may be arranged as a mesh interconnect, a shared interconnect, a peer-to-peer (P2P) interconnect, a ring interconnect, and so forth. Although only one first core 112 and one second core 116 are depicted, it will be appreciated that multiple first cores 112 and second cores 116 may be included in some embodiments. The first core 112 and the second core 116 may be configured to share cache memory or other logic. As used herein, cores include, but are not limited to, central processing units (CPUs), graphics processing units (GPUs), floating point units (FPUs) and so forth. The first core 112 and second core 116 may use differing amounts of power during execution of the same portions of executable threads of instructions. For example, the first core 112 may consume a first maximum power during normal operation at a maximum frequency and voltage within design specifications for these cores. The first core 112 may be configured to enter various lower power states including low power or standby states during which the first core 112 consumes a first minimum power, such as zero when off. In contrast, the second core 116 may consume a second maximum power during normal operation at a maximum frequency and voltage within design specification for these cores. The second maximum power may be less than the first maximum power. This may occur for many reasons, including the second core 116 having fewer logic elements than the first cores 112, different semiconductor construction, and so forth. As shown here, a graph depicts maximum power usage 134 of the first core 112 compared to maximum power usage 136 of the second core 116. The power usage 134 is greater than the power usage 136.

The first core 112 comprises a first set of registers 110, an instruction decoder 111 to receive an executable thread portion, e.g. a portion of a copy of executable thread T1 from cache 142, and an execution unit 113 to execute the executable thread portion. It will be appreciated that core 112 may comprise more that one execution unit 113 and additional logic (not shown) to execute the executable thread portion, a description of which is not required for an understanding of the present example. The second core 116 comprises a second set of registers 120, an instruction decoder 115 to receive an executable thread portion, e.g. a portion of a copy of executable thread T2 from cache 146, and an execution unit 117 to execute the instruction set of the second ISA 118. The second set of registers 120 may or may not include the same number, or types, or sizes of registers as the first set of registers 110, and in some embodiments those registers of the first set of registers 110 not in registers 120 may be emulated using translation data storage 127 and accessed via a bus or interconnect 129. It will also be appreciated that core 116 may comprise more that one execution unit 117 and additional logic (not shown) to executed the instruction set of the second ISA 118, a description of which is not required for an understanding of the present example. The instruction decoder 115 of second core 116, in addition to receiving the portion of executable thread T2, may detect an invalid opcode in the instruction set of the second ISA 118. In particular the invalid opcode may be a valid opcode of the excluded portion of the first instruction set the first ISA 114.

Some portion of asymmetric multiprocessor system 100, e.g. an exclusive execution environment 104, may comprise a microcode layer disassembler 125 to determine if the invalid opcode should be translated. If so a translation runtime environment 130 can be used to identify an executable region containing the invalid opcode and any other proximate invalid opcodes and interjacent valid opcodes, so that a partial binary translation of the entire executable region may be generated for executing and optionally re-executing the invalid opcode. The executable region is analyzed by translation runtime environment 130 logic, which in some embodiments may comprise an analysis unit, to determine at least a first machine state prior to the execution of the invalid opcode, and potentially any other machine states prior to execution of other proximate invalid opcodes so that a state recovery mechanism 128 can be used in conjunction with execution unit 117 to restore the corresponding machine state from translation data storage 127 upon an occurrence of a fault or other interruption during execution of the invalid opcode translation. Translation runtime environment 130 logic as well as other mechanisms and/or logic described herein may comprise dedicated hardware or software or firmware operation codes executable by general purpose machines or by special purpose machines or by a combination of both.

A partial binary translation of the entire executable region is then generated by translation runtime environment 130 logic, the partial binary translation including at least an encapsulation of a binary translation of the invalid opcode and the state recovery mechanism of the corresponding first machine state. An indicator of the partial binary translation is associated with the invalid opcode for re-executing the invalid opcode in the future. The partial binary translation of the entire executable region may be stored in a translation cache 126 and the executable region of the invalid opcode is emulated by core 116 executing a portion of executable thread T2' from cache 126, which is translated into the instruction set of the second ISA 118.

It will be appreciated that at an arbitrary point within the partial binary translation of an executable region, the processor or core machine state may be different from the virtualized native state. Before passing control from the exclusive execution environment 104 and/or a translation cache 126 execution mode, to a native cache 146 execution mode, e.g. upon occurrence of external interrupts, exceptions, or at the end of a translation, the processor or core machine state may need to be recovered and/or restored. This may include recovery of architectural programmer accessible registers, and/or instruction pointer recovery. In one embodiment the instruction pointer within exclusive execution environment 104 and/or a translation cache 126 execution mode is fully virtualized, and instruction pointer recovery from within an encapsulation of a binary translation of an invalid opcode may be facilitated through storing an offset from an original page's linear address to an original instruction pointer (IP) for the invalid opcode in translation data storage 127 as part of the state recovery mechanism of the corresponding machine state. For other interjacent valid opcodes occurring between the original invalid opcodes, the trace runtime environment 130 may maintain a data structure to hold a mapping of instruction offsets within pages of the partial binary translation, to instruction offsets within their original pages of the native untranslated code to facilitate instruction pointer recovery outside an encapsulation.

Figure 2:
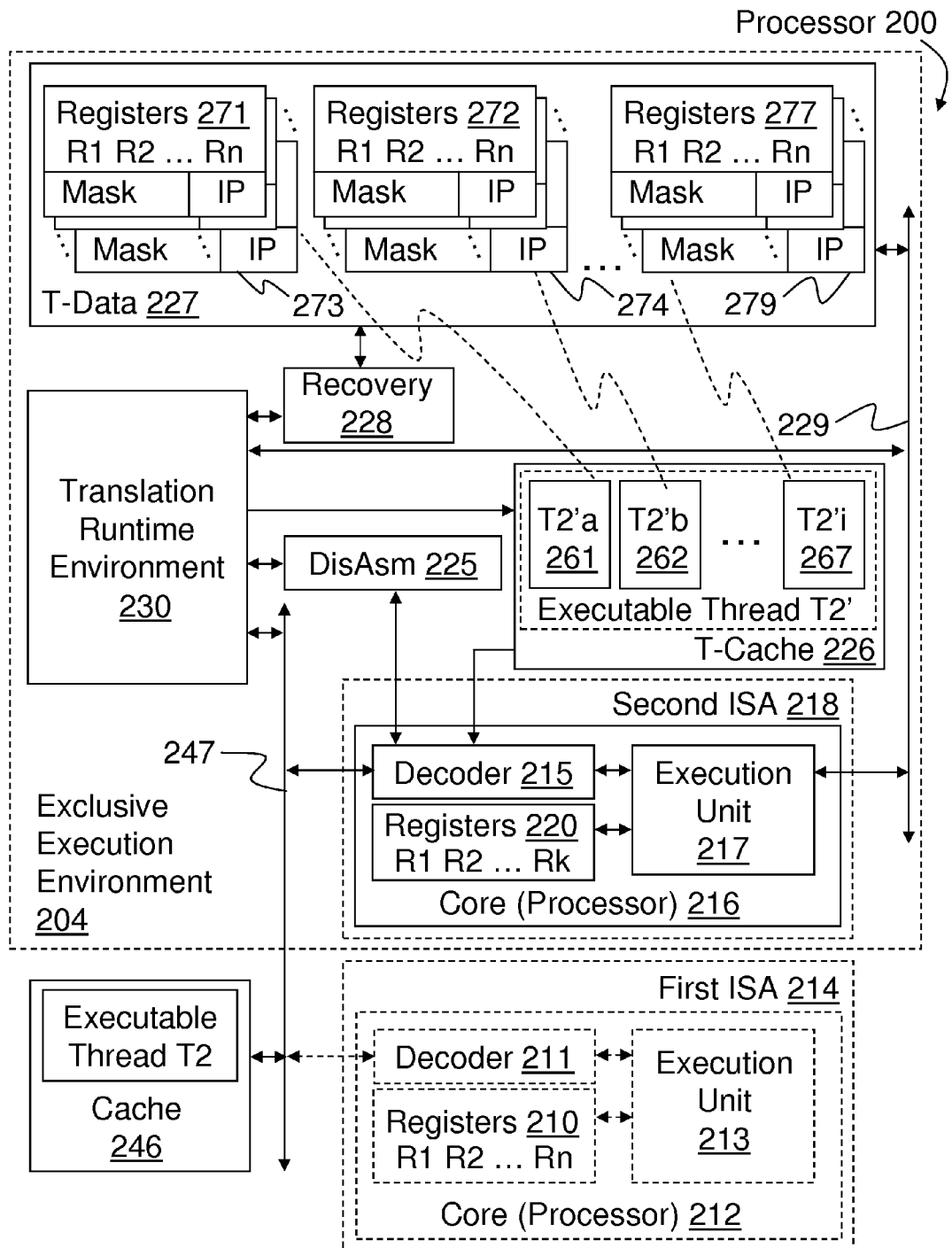
FIG. 2 illustrates one embodiment of a processor for providing ISA virtualization using dynamic partial binary translation functionality.

FIG. 2 illustrates one embodiment of a processor 200 for providing ISA virtualization using dynamic partial binary translation functionality. During the execution of programs of one or more applications, operating systems, drivers, etc., one or more threads, e.g. executable thread T2, are stored, e.g. in cache 246, for execution by a core or other processor. The executable threads in this example may be encoded in a particular native instruction set, e.g. the instruction set of a first ISA 214.

Embodiments of processor 200 optionally comprise a first heterogeneous processor core 212 having a first instruction set, e.g. the native instruction set of the first ISA 214, and comprise a second heterogeneous processor core 216 having a second instruction set, e.g. the instruction set of the second ISA 218, excluding a portion of the first instruction set, for example, excluding support for some of the native instructions of the first ISA 214.

In some implementations the optional first core 212 and the second core 216 may be coupled to one another and to other components, such as cache 246 and a translation runtime environment 230, using a bus or interconnect 247. In some implementations the optional first core 212 may be instantiated through virtualization technology and dynamic partial binary translation functionality. The optional first core 212 and the second core 216 may be configured to share cache memory 246 or other logic.

The optional first core 212 comprises a first set of registers 210, an instruction decoder 211 to receive an executable thread portion, e.g. a portion of a copy of executable thread T2 from cache 246, and an execution unit 213 to execute the executable thread portion. It will be appreciated that optional first core 212 may comprise more that one execution unit 213 and additional logic (not shown) to execute the executable thread portion, a description of which is not required for an understanding of the present example. The second core 216 comprises a second set of registers 220, an instruction decoder 215 to receive an executable thread portion, e.g. a portion of a copy of executable thread T2 from cache 246, and an execution unit 217 to execute the instruction set of the second ISA 218. The second set of registers 220 may or may not include the same number, or types, or sizes of registers as the first set of registers 210, and in some embodiments those registers of the first set of registers 210 not in registers 220 may be emulated using translation data storage 227, e.g. by one or more copies of registers 271, 272, 277, etc., and accessed via a bus or interconnect 229. Some embodiments of translation data storage 227 provide for a mask to indicate which registers have been saved, or are emulated, and/or need to be restored by a dynamic state recovery mechanism 228. In addition, the translation runtime environment 130 may maintain information with regard to emulated registers to facilitate virtualization of the first ISA 214. For example, if the AVX 256-bit YMM registers are being emulated using 128-bit XMM registers in an x86 ISA, translation runtime environment 130 may maintain the following information:

(a) an index of the XMM register used as a temporal register to hold the upper part of an AVX instruction destination;

(b) an indicator of whether the destination of the AVX instruction is a register or memory operand;

(c) in the case of a register destination in (b) an index of the destination YMM register; and (d) in the case of a memory destination in (b) indices of general purpose registers holding the base address and holding the memory index, the scale and displacement values. In addition, other information may be maintained by translation runtime environment 130, such as: the original AVX instruction length, and a starting and ending point of any code sequence to commit the new register and/or memory state as the result of the emulated instruction. For alternative embodiments, such indications and information may be implicit or integrated into translation data storage 227. It will also be appreciated that core 216 may comprise more that one execution unit 217 and additional logic (not shown) to executed the instruction set of the second ISA 218, a description of which is not required for an understanding of the present example. The instruction decoder 215 of second core 216, in addition to receiving the portion of executable thread T2, may detect an invalid opcode in the instruction set of the second ISA 218. In particular the invalid opcode may be a valid opcode of the excluded portion of the first instruction set the first ISA 214.

Some portion of processor 200, e.g. an exclusive execution environment 204, may comprise a microcode layer disassembler 225 to determine if the invalid opcode should be translated. If so a translation runtime environment 230 can be used to identify an executable region containing the invalid opcode and any other proximate invalid opcodes and interjacent valid opcodes, so that a partial binary translation of the entire executable region may be generated for executing and optionally re-executing the invalid opcode. The executable region is analyzed by translation runtime environment 230 logic to determine at least a first machine state prior to the execution of the invalid opcode, and potentially any other machine states prior to execution of other proximate invalid opcodes so that a state recovery mechanism 228 can be used in conjunction with translation data storage 227 and execution unit 217 to restore the machine state upon an occurrence of a fault or other interruption during execution of the translated invalid opcode. For one embodiment, if such an occurrence of a fault or other interruption during execution of the translated invalid opcode happens before the beginning of any code sequence to commit new register and/or memory state as a result of the translated invalid opcode, then recovery of the machine state just before emulating the invalid opcode may be performed. On the other hand, if a fault or interruption occurs during or after any code sequence to commit new register and/or memory state as a result of the translated invalid opcode, then recovery of the machine state as it would appear just after executing the invalid opcode may be performed.

A partial binary translation of the entire executable region is generated by translation runtime environment 230 logic. The partial binary translation includes at least an encapsulation of a binary translation of the invalid opcode and the state recovery mechanism of the corresponding first machine state, e.g. 273. Some embodiments of the partial binary translations may include an encapsulation of a binary translation of each invalid opcode of the entire executable region and a corresponding state recovery mechanism of each corresponding machine state, as shown by 273. An indicator of the partial binary translation is associated with the invalid opcode for re-executing the invalid opcode in the future. The partial binary translation of the entire executable region, e.g. T2'a 261, may be stored in a translation cache 226 and the executable region of the invalid opcode is emulated by core 216 executing the portion, e.g. T2'a 261, of executable thread T2' from cache 226, which has been translated into the instruction set of the second ISA 218. Following a successful completion of the executable region, core 216 performs a jump to the instruction pointer (IP) at the end of the executable region in the executable thread T2. For some embodiments this jump may be accompanied by a side effect of committing, restoring or updating any necessary machine and/or memory state using, at least in part, state recovery mechanism 228. Similarly, for each subsequent detection of an untranslated opcode of the excluded portion of the first instruction set of the first ISA 214, a partial binary translation of the entire executable region is generated by translation runtime environment 230 logic. These partial binary translations include at least encapsulations of binary translations of the respective invalid opcodes, and the state recovery mechanism of the corresponding first machine states, e.g. 274 . . . 279. Indicators of the partial binary translations are associated with the invalid opcodes for re-executing the invalid opcodes in the future. The partial binary translations of the entire executable regions, e.g. T2'b 262 . . . T2'i 267, may be stored in a translation cache 226 and the executable regions of the invalid opcodes are emulated by core 216 executing the portions, e.g. T2'b 262 . . . T2'i 267, of executable thread T2' from cache 226, which have been translated into the instruction set of the second ISA 218.

Figure 3:
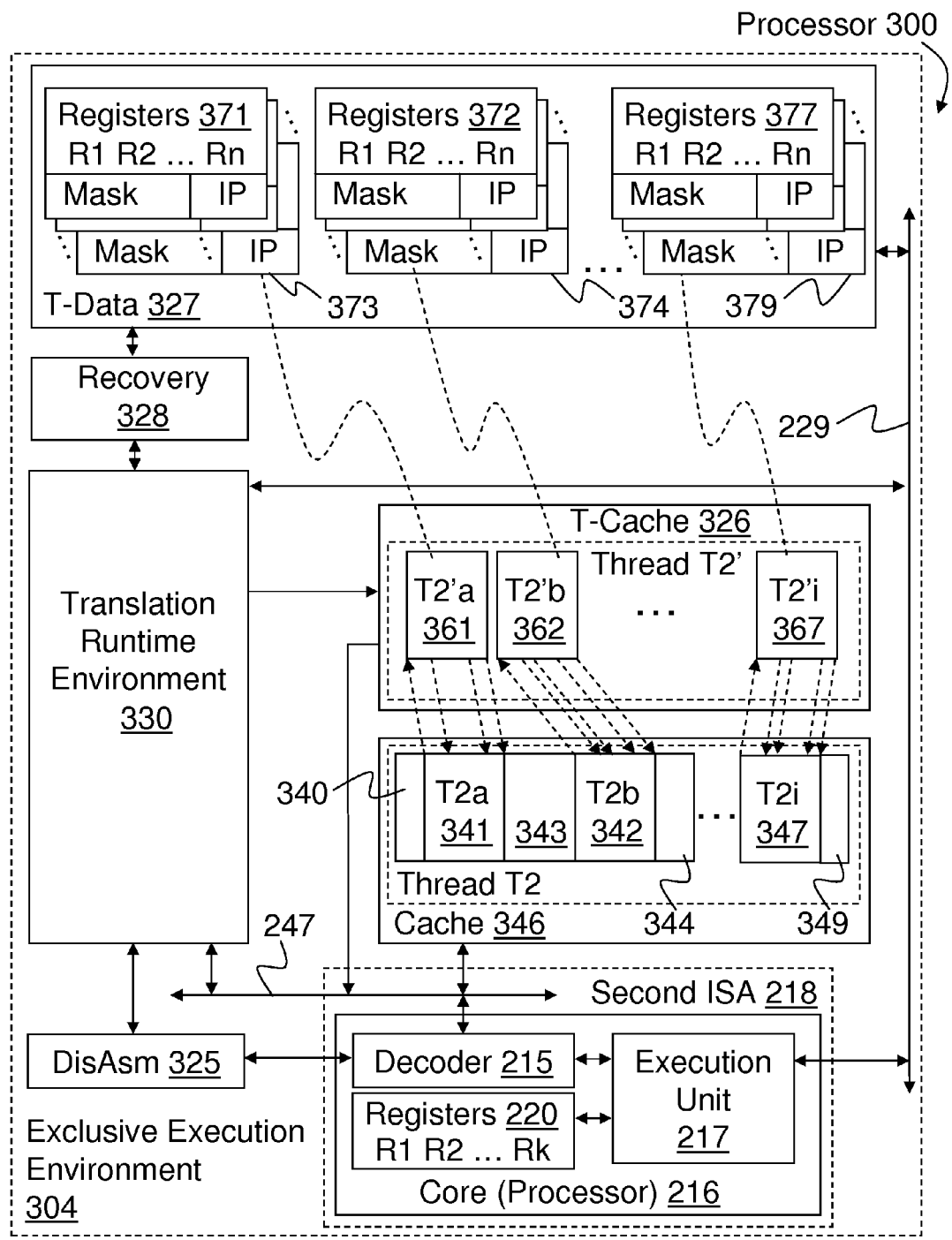
FIG. 3 illustrates an alternative embodiment of a processor for providing ISA virtualization using dynamic partial binary translation functionality.

FIG. 3 illustrates an alternative embodiment of a processor 300 for providing ISA virtualization using dynamic partial binary translation functionality. During the execution of programs of one or more applications, operating systems, drivers, etc., one or more threads, e.g. executable thread T2, are stored, e.g. in cache 346, for execution by a core or other processor. The executable threads in this example may be encoded in a particular native instruction set, e.g. the instruction set of first ISA 114 or first ISA 214.

Embodiments of processor 300 comprise a processor core 216 having a second instruction set, e.g. the instruction set of the second ISA 218, excluding a portion of the first instruction set, for example, support for some of the native instructions of first ISA 114 or first ISA 214.

In some implementations the second core 216 may be coupled to other components, such as cache 346, translation cache 326, and a translation runtime environment 330, using a bus or interconnect 247. In some implementations an optional first core, having a native instruction set, e.g. the instruction set of first ISA 114 or first ISA 214, may be instantiated through virtualization technology and dynamic partial binary translation functionality. The optional first core may comprise a first set of registers, e.g. registers 371, registers 372, . . . registers 377, an instruction decoder 215 to receive an executable thread portion, e.g. a portion of a copy of executable thread T2 from cache 346, and an execution unit 217 to virtually execute the executable thread portion. The second core 216 comprises a second set of registers 220, an instruction decoder 215 to receive an executable thread portion, e.g. a portion of a copy of executable thread T2 from cache 346, and an execution unit 217 to execute the instruction set of the second ISA 218. The second set of registers 220 may or may not include the same number or types or sizes of registers as the first set, e.g. of registers 371, registers 372, . . . registers 377, and in some embodiments those registers of the first set of registers not in registers 220 may be emulated using translation data storage 327 and accessed via a bus or interconnect 229. Some embodiments of translation data storage 327 provide for a mask to indicate which registers have been saved, or are emulated, and/or need to be restored by a dynamic state recovery mechanism 328. For alternative embodiments such an indication may be implicit or may be integrated into translation data storage 327. The instruction decoder 215 of core 216, in addition to receiving the portion of executable thread T2, may detect an invalid opcode in the instruction set of the second ISA 218. Of particular importance, the invalid opcode may be a valid opcode of the excluded portion of the native instruction set, e.g. of the first ISA 114 or the first ISA 214.

Some portion of processor 300, e.g. an exclusive execution environment 304, may comprise a microcode layer disassembler 325 to determine if the invalid opcode should be translated. If so a translation runtime environment 330 can be used to identify an executable region containing the invalid opcode and any other proximate invalid opcodes and interjacent valid opcodes, so that a partial binary translation of the entire executable region may be generated for executing and optionally re-executing the invalid opcode. The executable region is analyzed by translation runtime environment 330 logic to determine at least a first machine state prior to the execution of the invalid opcode, and potentially any other machine states prior to execution of other proximate invalid opcodes so that a state recovery mechanism 328 can be used in conjunction with translation data storage 327 and execution unit 217 to restore the machine state upon an occurrence of a fault or other interruption during execution of the translated invalid opcode.

A partial binary translation of the entire executable region is generated by translation runtime environment 330 logic. The partial binary translation includes at least an encapsulation of a binary translation of the invalid opcode and the state recovery mechanism of the corresponding first machine state, e.g. 373. Some embodiments of the partial binary translations may include an encapsulation of a binary translation of each invalid opcode of the entire executable region and a corresponding state recovery mechanism of each corresponding machine state, as shown by 373. An indicator of the partial binary translation is associated with the invalid opcode for re-executing the invalid opcode in the future. The partial binary translation of the entire executable region, e.g. T2'a 361, may be stored in a translation cache 326 and the executable region of the invalid opcode is emulated by core 216 executing the portion, e.g. T2'a 361, of executable thread T2' from cache 326, which has been translated into the instruction set of the second ISA 218. Following a successful completion of the executable region, core 216 performs a jump to the instruction pointer (IP) at the end of the executable region in the executable thread T2, e.g. 343. For some embodiments this jump may be accompanied by a side effect of committing, restoring or updating any necessary machine and/or memory state, e.g. 373, using, at least in part, state recovery mechanism 328. Similarly, for each subsequent detection of an untranslated opcode of the excluded portion of the native instruction set, e.g. of the first ISA 114 the first ISA 214, a partial binary translation of the entire executable region is generated by translation runtime environment 330 logic. These partial binary translations, e.g. T2'b 362 . . . T2'i 367, include at least encapsulations of binary translations of the respective invalid opcodes, and the state recovery mechanism of their corresponding machine states, e.g. 374 . . . 379. Indicators of the partial binary translations are associated with the invalid opcodes for re-executing the invalid opcodes in the future. The partial binary translations of the entire executable regions, e.g. T2'b 362 . . . T2'i 367, may be stored in a translation cache 326 and the executable regions of the invalid opcodes are emulated by core 216 executing the portions, e.g. T2'b 362 . . . T2'i 367, of executable thread T2' from cache 326, which have been translated into the instruction set of the second ISA 218.

It will be appreciated that following partial binary translation of an executable thread T2 as shown the core 216 may emulate portions of the native instruction set, e.g. of the first ISA 114 the first ISA 214, in the execution of executable thread T2, by executing the code sequences: 340, 361 (corresponding to T2a 341), 343, 362 (corresponding to T2b 342), 344, . . . 367 (corresponding to T2i 347), and 349. It will also be appreciated that exclusive execution environment 304 supports dynamic state recovery 328 for the encapsulation of a binary translation of each invalid opcode based on the corresponding state recovery mechanisms, e.g. one or more copies of registers 371 of 373, one or more copies of registers 372 of 374, . . . one or more copies of registers 377 of 379, and a corresponding instruction pointer for the respective encapsulation. Following a successful completion or upon interruption in the executable region in exclusive execution environment 304, core 216 performs a global jump either to the corresponding instruction pointer of the executable region in the executable thread T2, for the encapsulation successfully completed, or to the corresponding instruction pointer of the executable region in the executable thread T2, for the encapsulation interrupted, with a side effect of committing, restoring or updating the machine and/or memory state according to the corresponding state recovery mechanism.

It will be appreciated that embodiments to support instructions of a first processing core using a second processing core, wherein the first and second cores may use differing amounts of power during execution of the same portions of executable threads of instructions, provide opportunities to save costs and/or power consumption, while supporting features of a rich native instruction set of the first processing core. The second core may consume a less power during normal operation at maximum frequency and voltage due to having a less complex micro-architecture with portions having fewer logic elements, different semiconductor construction, and so forth. Thus cost savings and/or reduced power consumption may be realized by various embodiments of the herein disclosed methods, apparatus and systems for virtualization of a native instruction set.

Figure 4:
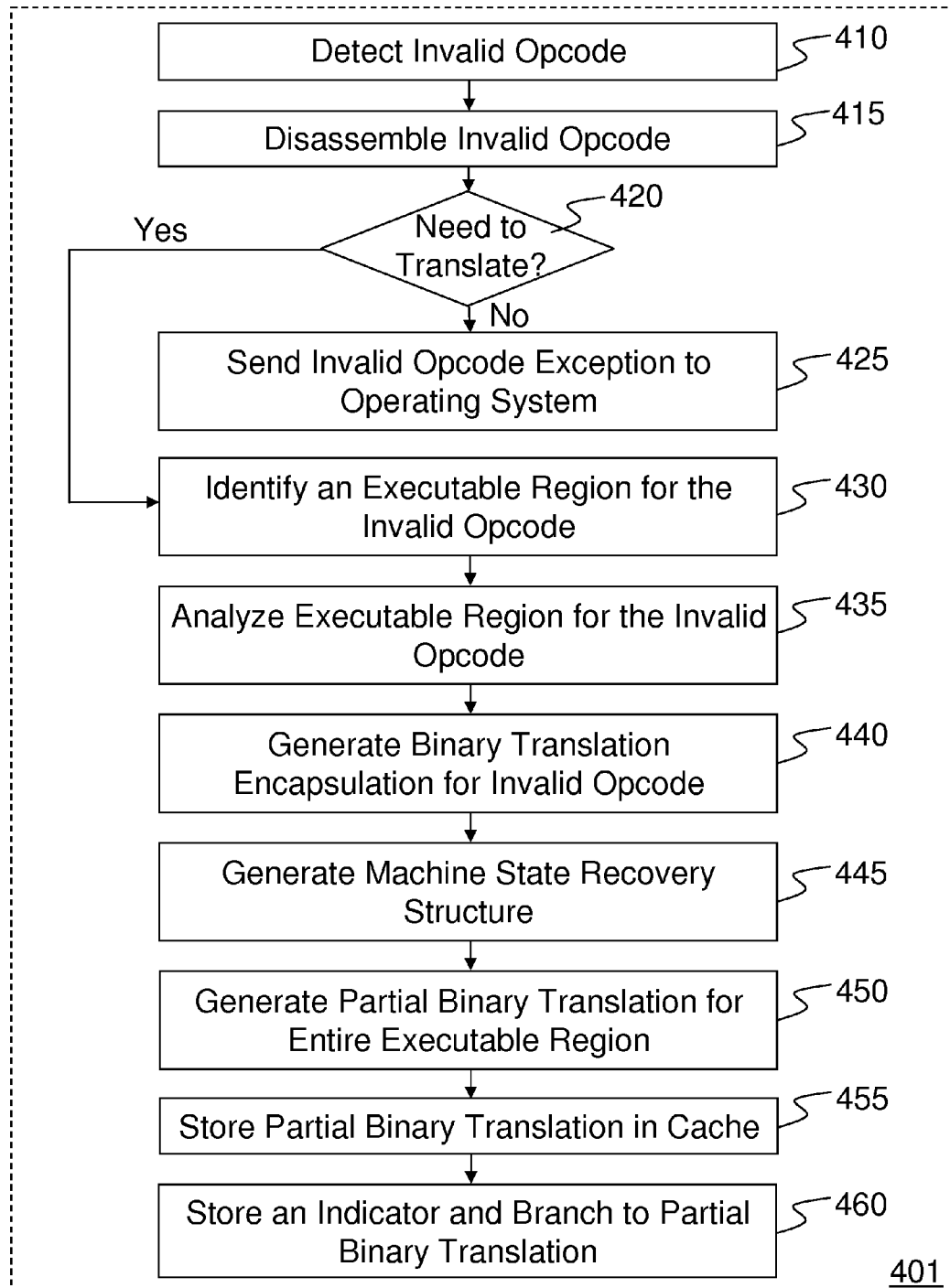
FIG. 4 illustrates a flow diagram for one embodiment of a process for using a dynamic partial binary translation runtime environment to provide ISA virtualization.

FIG. 4 illustrates a flow diagram for one embodiment of a process 401 for using a dynamic partial binary translation runtime environment to provide ISA virtualization. Process 401 and other processes herein disclosed are performed by processing blocks that may comprise dedicated hardware or software or firmware operation codes executable by general purpose machines or by special purpose machines or by a combination of both.

In processing block 410 an invalid opcode is detected, e.g. by decoder 115 or 215. In processing block 415 the invalid opcode is disassembled, e.g. by a microcode layer disassembler. Then in processing block 420 it is determined if the invalid opcode should be translated, that is to say if it is a valid opcode of the excluded portion of the native instruction set, e.g. of the first ISA 114 or the first ISA 214. If not, then an invalid opcode exception may be sent to an operating system for exception handling in processing block 425. Otherwise, translation will proceed in processing block 430 where an executable region containing the invalid opcode and at least any other proximate invalid opcodes and interjacent valid opcodes is identified. In processing block 435 the executable region is analyzed to determine at least a first machine state prior to the execution of the invalid opcode. Processing proceeds to processing block 440 where a binary translation encapsulation of the invalid opcode is generated and in 445 a machine state recovery mechanism structure is generated for the first machine state. In processing block 450 a partial binary translation of the entire executable region is generated including an encapsulation of a binary translation and state recovery for the invalid opcode and any other proximate invalid opcodes together with any interjacent valid opcodes of the executable region. In processing block 455 the partial binary translation is stored in a cache memory, e.g. translation cache 126, 226 or 326. Then in processing block 460, an indicator of the partial binary translation associated with the invalid opcode is stored to facilitate re-executing the partial binary translation upon future detections of the invalid opcode, and a branch is taken to execute the partial binary translation. For some embodiments storing an indicator of the partial binary translation may include storing a jump to the partial binary translation code in the original executable region, or introducing a special exception to the fetching of an instruction of the executable region, or marking a page to be checked when fetching an instruction of the executable region. For some alternative embodiments, storing an indicator of the partial binary translation may also include introducing a taken branch into a branch target buffer entry for the cache line of an instruction of the executable region, and/or storing a branch to the partial translation in another partial binary translation to facilitate chaining the two partial binary translations together.

Figure 5:
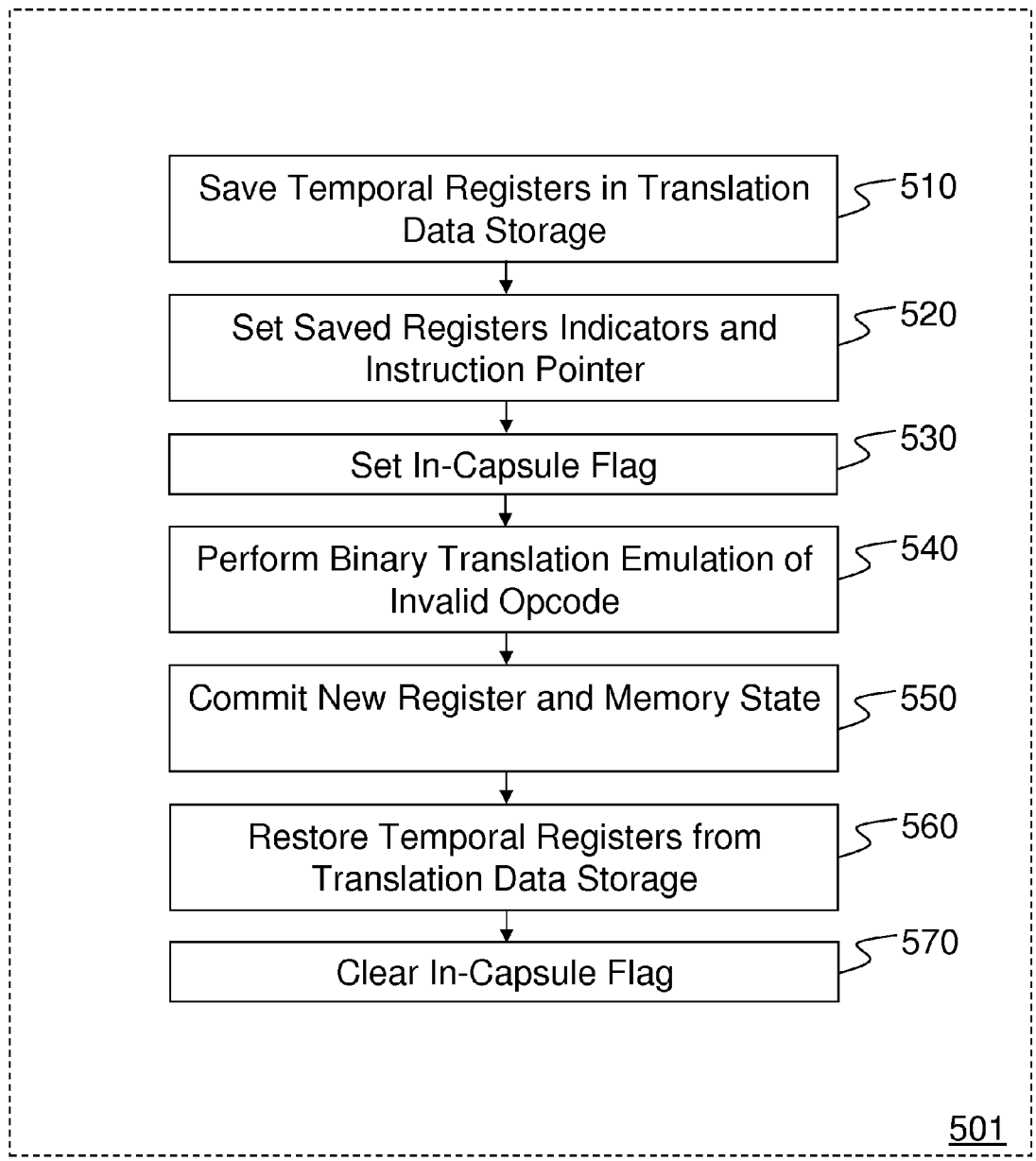
FIG. 5 illustrates a flow diagram for an embodiment of a process to use encapsulation in a dynamic partial binary translation to provide ISA virtualization.

FIG. 5 illustrates a flow diagram for an embodiment of a process 501 to use encapsulation in a dynamic partial binary translation. In some embodiments an encapsulation 501 of each invalid opcode in the entire executable region may be sued to provide ISA virtualization. In processing block 510 temporal registers are saved in translation data storage, e.g. storage 127, 227 or 327. In processing block 520, saved register indicators and instruction pointer(s) are set, e.g. 273, 247, . . . 279, or 373, 347, . . . 379. In processing block 530, an in-capsule flag is set to indicate that execution is within the capsule. In some embodiments the in-capsule flag may be included in a bit mask associated with the saved machine state illustrated in FIGS. 2 and 3, or alternatively the in-capsule flag may be set and accessed according to some other execution mechanism such as roll-back instructions to restore architectural registers to previously recorded execution checkpoint states. Processing then proceeds to processing block 540 where the binary translation emulation of the invalid opcode is performed. Then in processing block 550 the new register state and/or memory state is committed, and in processing block 560 the temporal registers are restored from translation data storage. Finally, in processing block 570 the in-capsule flag is cleared to indicate that execution is now outside the capsule. It will be appreciated that various kinds of optimizations may be applied to encapsulations of the invalid opcodes, both within a capsule and across capsules, such as: the setting and clearing of saved register indicators in a bit mask may be removed from inside the capsule, or making use of "free" unused registers, or loop unrolling and instruction scheduling, etc.

Figure 6:
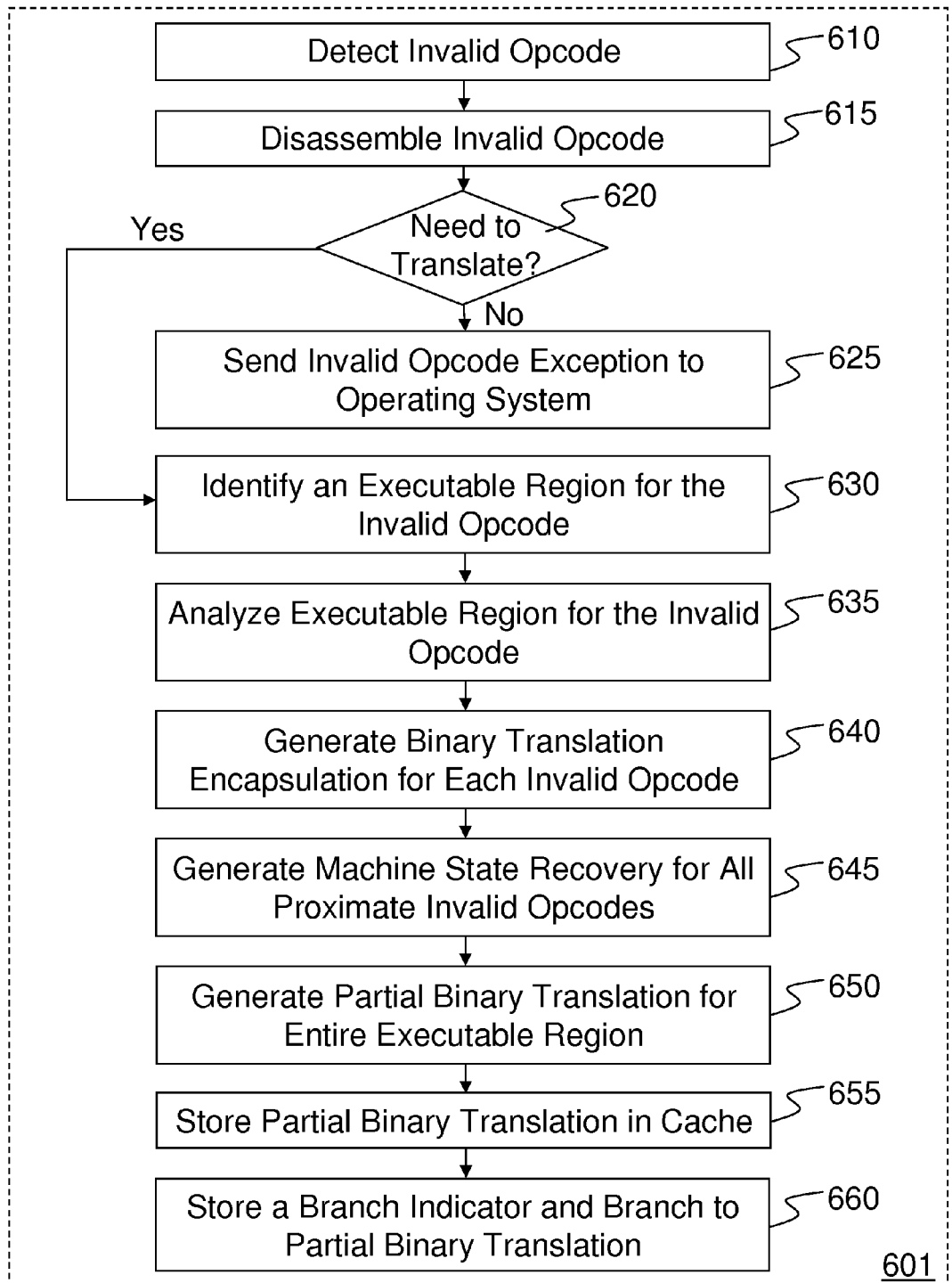
FIG. 6 illustrates a flow diagram for another alternative embodiment of a process to use dynamic partial binary translation functionality to provide ISA virtualization.

FIG. 6 illustrates a flow diagram for another alternative embodiment of a process 601 to use dynamic partial binary translation functionality to provide ISA virtualization. In processing block 610 an invalid opcode is detected, e.g. by decoder 115 or 215. In processing block 615 the invalid opcode is disassembled, e.g. by a microcode layer disassembler. Then in processing block 620 it is determined if the invalid opcode should be translated, that is to say if it is a valid opcode of the excluded portion of the native instruction set, e.g. of the first ISA 114 or the first ISA 214. If not, then an invalid opcode exception may be sent to an operating system for exception handling in processing block 625.

Otherwise, translation will proceed in processing block 630 where an executable region containing the invalid opcode and at least any other proximate invalid opcodes and interjacent valid opcodes is identified. In processing block 635 the executable region is analyzed to determine at least a first machine state prior to the execution of the invalid opcode. Processing proceeds to processing block 640 where a binary translation encapsulation, e.g. as shown in process 501, of each invalid opcode in the entire executable region is generated. In processing block 645 a machine state recovery mechanism structure is generated for each of the machine states corresponding to the invalid opcode and any other proximate invalid opcodes in the entire executable region. In processing block 650 a partial binary translation of the entire executable region is generated including the encapsulations of binary translations and state recovery for the invalid opcode and any other proximate invalid opcodes together with any interjacent valid opcodes of the executable region. It will be appreciated that during generation of the partial binary translation of the entire executable region, various other optimizations may be carried out. For example saving and restoring of some temporal registers in between encapsulations of binary translations for proximate invalid opcodes may be eliminated through intelligent choice of register reuse without changing functionality of the translations, while improving the overall execution performance of the partial binary translation.

In processing block 655 the partial binary translation is stored in a cache memory, e.g. translation cache 126, 226 or 326. Then in processing block 660, an indicator of the partial binary translation associated with the invalid opcode is stored to facilitate re-executing the partial binary translation upon future detections of the invalid opcode, and a branch is taken to execute the partial binary translation.

Figure 7:
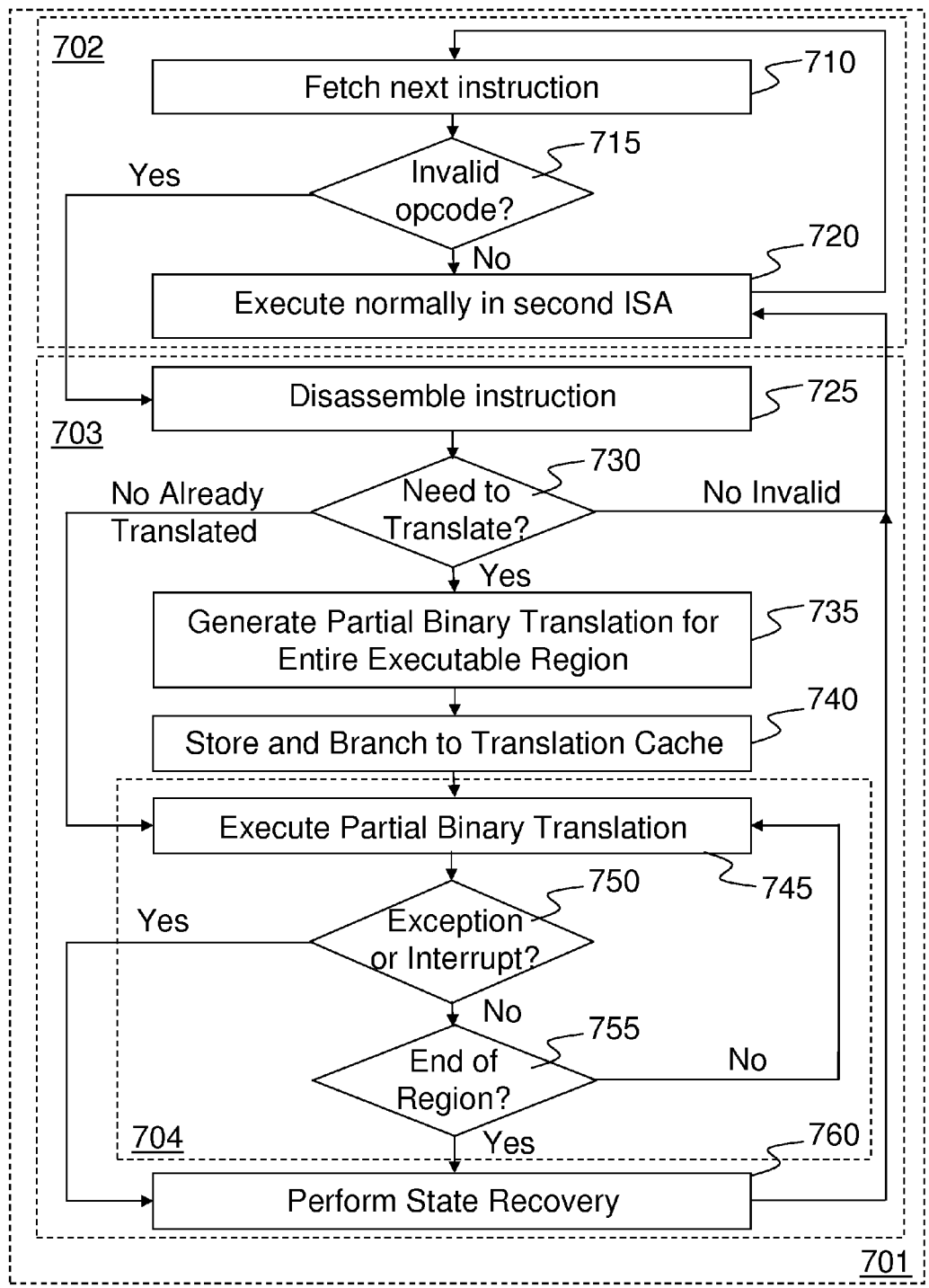
FIG. 7 illustrates a flow diagram for another alternative of a process to use dynamic partial binary translation functionality to provide ISA virtualization.

FIG. 7 illustrates a flow diagram for another alternative of a process 701 to use dynamic partial binary translation functionality to provide ISA virtualization. In processing block 710 of process 702 the next sequential instruction of a portion of a thread is fetched. In processing block 715, it is determined if the instruction has an invalid opcode. If not, the instruction will be executed normally in processing block 720 since it is a valid instruction of the second ISA, e.g. 118 or 218, after which processing will reiterate beginning with processing block 710. Thus processing remains in process 702, which represents the normal machine execution environment context—openly accessible to the operating system and application programmers. Otherwise, if the instruction has an invalid opcode, i.e. according to the second ISA, processing proceeds to processing block 725 of process 703 where the instruction may be disassembled to see if it needs to be translated. Process 703 represents an exclusive machine execution environment context—not openly accessible to the operating system and application programmers, e.g. 104, 204 or 304. In processing block 730 a determination is made whether or not the instruction needs to be translated. If the instruction is an invalid instruction in the instruction set of the first ISA, e.g. 114 or 214, then processing returns to the context of process 702 and processing block 720 where the instruction is handled normally, i.e. causing an invalid opcode exception. If the instruction is a valid instruction in the instruction set of the first ISA but has already been translated processing proceeds in processing block 745 by executing the corresponding partial binary translation from the translation cache, e.g. 126, 226 or 326. Otherwise, if the instruction is a valid instruction in the instruction set of the first ISA and has not already been translated processing proceeds in processing block 735 where a partial binary translation is generated for the entire executable region of the instruction, e.g. by translation runtime environment 130, 230 and/or 330 as in processing blocks 430-450 and/or 630-650. Then in processing block 740 partial binary translation is stored to a translation cache, e.g. 126, 226 or 326, and a branch is taken to the partial binary translation. Processing then proceeds to processing block 745 of process 704 where the partial binary translation is executed. Process 704 represents the emulation execution environment context wherein the first ISA is being virtualized—executable only from within the exclusive context of process 703 and directly accessed from the translation runtime environment, state recovery mechanism and the partial binary translation code itself. In processing block 750 it is determined whether or not an exception or other interruption has occurred within the partial binary translation context of process 704. If so processing proceeds to processing block 760 where state recovery is performed. Otherwise a determination is made in processing block 755 whether execution has reached the end of the entire executable region. If not processing reiterates beginning in processing block 745 until the partial binary translation for the entire executable region has finished executing, at which point processing proceeds to processing block 760 where state recovery is performed. Processing then returns to the normal execution context of process 702 and to processing block 720.

It will be appreciated that for some embodiments supporting instructions of a first processing core using a second processing core where the first and second cores may use differing amounts of power during execution of the same portions of executable threads of instructions provides for numerous opportunities in saving costs and/or power consumption for some applications, while still supporting features of a rich native instruction set. For example, the first core may consume a greater maximum power during normal operation at maximum frequency and voltage, wherein the second core may consume a smaller maximum power during normal operation at maximum frequency and voltage within design specification for these cores. This may be due to reasons, including the second core having fewer logic elements, different semiconductor construction, less complex microarchitectural components, and so forth. Thus the benefits of cost savings and/or reduced power consumption may be realized by various embodiments of the methods, apparatus and systems for virtualization of a native instruction set as herein disclosed.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method for partial binary translation, the method comprising:
   detecting an invalid opcode;
   determining if the invalid opcode should be translated;
   identifying an executable region containing the invalid opcode and at least any other proximate invalid opcodes and interjacent valid opcodes for executing and optionally repeatably executing the invalid opcode;
   analyzing the executable region to determine at least a first machine state prior to the execution of the invalid opcode;
   generating a partial translation of the entire executable region, the partial translation including at least an encapsulation of a binary translation of the invalid opcode and a state recovery mechanism of said first machine state;
   storing the partial translation in a cache memory; and
   storing an indicator of the partial translation associated with the invalid opcode.

2. The method of claim 1 wherein the partial translation includes a jump to the endpoint of the executable region.

3. The method of claim 2 wherein a subsequent detection of the invalid opcode causes a branch to the stored partial translation in an exclusive execution environment.

4. The method of claim 3 wherein said exclusive execution environment supports the state recovery mechanism.

5. The method of claim 1 further comprising:
   branching to the stored partial translation; and
   executing the partial translation in an exclusive execution environment.

6. The method of claim 1 wherein storing an indicator of the partial translation includes storing a jump to the partial translation in the executable region.

7. The method of claim 1 wherein storing an indicator of the partial translation includes introducing an exception to fetching an instruction of the executable region.

8. The method of claim 1 wherein storing an indicator of the partial translation includes marking a page to be checked when fetching an instruction of the executable region.

9. The method of claim 1 wherein storing an indicator of the partial translation includes introducing a taken branch in a branch target buffer entry for the cache line of an instruction of the executable region.

10. The method of claim 1 wherein storing an indicator of the partial translation includes storing a branch to the partial translation in another partial translation.

11. An article of manufacture comprising:
    a machine-accessible medium including data and instructions for partial binary translation such that, when accessed by a machine, cause the machine to:
       receive an executable thread portion in a processor, the executable thread portion including an invalid opcode;
       detect the invalid opcode;
       determine if the invalid opcode should be translated;
       identify an executable region containing the invalid opcode and at least any other proximate invalid opcodes and interjacent valid opcodes for executing and optionally repeatably executing the invalid opcode;
       analyze the executable region to determine at least a first machine state prior to the execution of the invalid opcode;
       generate a partial translation of the entire executable region, the partial translation including at least an encapsulation of a binary translation of the invalid opcode and a state recovery mechanism of said first machine state;
       store the partial translation in a cache memory; and
       store an indicator of the partial translation associated with the invalid opcode.

12. The article of manufacture of claim 11 wherein the partial translation includes a jump to the endpoint of the executable region in the executable thread.

13. The article of manufacture of claim 12 wherein a subsequent detection of the invalid opcode cause the machine to branch to the stored partial translation in an exclusive execution environment.

14. The article of manufacture of claim 13 wherein said exclusive execution environment supports the state recovery mechanism.

15. A processor comprising:
    an instruction decoder to receive an executable thread portion, and detect an invalid opcode;
    a microcode layer disassembler to determine if the invalid opcode should be translated;
    a translation runtime environment to:

identify an executable region containing the invalid opcode and at least any other proximate invalid opcodes and interjacent valid opcodes for executing and optionally repeatably executing the invalid opcode, analyze the executable region to determine at least a first machine state prior to the execution of the invalid opcode, generate a partial translation of the entire executable region, the partial translation including at least an encapsulation of a binary translation of the invalid opcode and a state recovery mechanism of said first machine state, and store an indicator of the partial translation associated with the invalid opcode; and a translation cache memory to store the partial translation.

16. The processor of claim 15 wherein the partial translation includes a jump to the endpoint of the executable region in the executable thread.

17. The processor of claim 16 wherein a subsequent detection of the invalid opcode cause the machine to branch to the stored partial translation in an exclusive execution environment.

18. The processor of claim 17 wherein said exclusive execution environment supports the state recovery mechanism.

19. The processor of claim 15 wherein storing an indicator of the partial translation includes marking a page to be checked when fetching an instruction of the executable region.

20. The processor of claim 15, said translation runtime environment also to:
branch to the stored partial translation; and
execute the partial translation in an exclusive execution environment.

21. A multi-core processor comprising:
a first heterogeneous processor core having a first instruction set; and
a second heterogeneous processor core having a second instruction set excluding a portion of the first instruction set, the second heterogeneous processor core including:
an instruction decoder to receive an executable thread portion, and detect an invalid opcode;
a microcode layer disassembler to determine if the invalid opcode should be translated;
a translation runtime environment to:
identify an executable region containing the invalid opcode and at least any other proximate invalid opcodes and interjacent valid opcodes for executing and optionally repeatably executing the invalid opcode,
analyze the executable region to determine at least a first machine state prior to the execution of the invalid opcode,
generate a partial translation of the entire executable region, the partial translation including at least an encapsulation of a binary translation of the invalid opcode and a state recovery mechanism of said first machine state, and
store an indicator of the partial translation associated with the invalid opcode; and
a translation cache memory to store the partial translation.

22. The multi-core processor of claim 21 wherein the partial translation includes a jump to the endpoint of the executable region in the executable thread.

23. The multi-core processor of claim 22 wherein a subsequent detection of the invalid opcode cause the machine to branch to the stored partial translation in an exclusive execution environment.

24. The multi-core processor of claim 23 wherein said exclusive execution environment supports the state recovery mechanism.

25. The multi-core processor of claim 24 wherein the translation runtime environment generates the partial translation including an encapsulation of a binary translation of each invalid opcode of the entire executable region and a corresponding state recovery mechanism of each corresponding machine state.

26. The multi-core processor of claim 25 wherein said exclusive execution environment supports dynamic state recovery for the encapsulation of a binary translation of each invalid opcode based on the corresponding state recovery mechanism and a corresponding instruction pointer for the encapsulation.

27. The multi-core processor of claim 26 wherein upon successful completion or interruption in said exclusive execution environment, a global jump to the corresponding instruction pointer for the encapsulation successfully completed or interrupted is performed with a side effect of the corresponding state recovery mechanism.

28. The multi-core processor of claim 27 wherein upon interruption in said exclusive execution environment, said global jump to the corresponding instruction pointer for the interrupted encapsulation and the side effect of the corresponding state recovery mechanism presents, through virtualization, as an interruption in the first heterogeneous processor core on an instruction boundary.

29. The multi-core processor of claim 21 wherein storing an indicator of the partial translation includes marking a page to be checked when fetching an instruction of the executable region.

30. The multi-core processor of claim 21, said translation runtime environment also to:
branch to the stored partial translation; and
execute the partial translation in an exclusive execution environment.

31. A computing system comprising:
an addressable memory to store a first executable thread portion encoded in a first instruction set; and
a multiprocessor including:
a first heterogeneous processor core to execute the first instruction set; and
a second heterogeneous processor core having a second instruction set excluding a portion of the first instruction set, the second heterogeneous processor core including:
an instruction decoder to receive an executable thread portion, and detect an invalid opcode;
a microcode layer disassembler to determine if the invalid opcode should be translated;
a translation runtime environment to:
identify an executable region containing the invalid opcode and at least any other proximate invalid opcodes and interjacent valid opcodes for executing and optionally repeatably executing the invalid opcode,
analyze the executable region to determine at least a first machine state prior to the execution of the invalid opcode,
generate a partial translation of the entire executable region, the partial translation including at least an encapsulation of a binary translation of the invalid opcode and a state recovery mechanism of said first machine state, and
store an indicator of the partial translation associated with the invalid opcode; and
a translation cache memory to store the partial translation.

32. The system of claim 31, wherein a subsequent detection of the invalid opcode cause the machine to branch to the stored partial translation in an exclusive execution environment.

33. The system of claim 32 wherein said exclusive execution environment supports the state recovery mechanism.

34. The system of claim 33 wherein the translation runtime environment generates the partial translation including an encapsulation of a binary translation of each invalid opcode of the entire executable region and a corresponding state recovery mechanism of each corresponding machine state.

35. The system of claim 34 wherein storing an indicator of the partial translation includes marking a page to be checked when fetching an instruction of the executable region.

36. The system of claim 31, said translation runtime environment also to:
branch to the stored partial translation; and
execute the partial translation in an exclusive execution environment.

* * * * *